United States Patent [19]
Takechi et al.

[11] Patent Number: 5,884,689
[45] Date of Patent: Mar. 23, 1999

[54] AIR CONDITIONING APPARATUS FOR VEHICLE

[75] Inventors: Tetsuya Takechi; Masami Taguchi; Yasuhiro Sato; Takahiro Suzuki, all of Kariya; Katsuyuki Oosaki, Chiryu; Isao Kinoshita, Kariya; Kotaro Suda, Hekinan, all of Japan

[73] Assignee: Denso Corporation, Kariya, Japan

[21] Appl. No.: 876,943

[22] Filed: Jun. 16, 1997

[30] Foreign Application Priority Data

| Jun. 17, 1996 | [JP] | Japan | ................................. 8-155820 |
| Nov. 7, 1996 | [JP] | Japan | ................................. 8-295374 |
| Dec. 24, 1996 | [JP] | Japan | ................................. 8-343408 |

[51] Int. Cl.⁶ ............................. F25B 29/00; F25D 17/08
[52] U.S. Cl. ............................. 165/43; 62/244; 454/121
[58] Field of Search ..................... 62/244; 165/42, 165/43; 454/121, 156

[56] References Cited

U.S. PATENT DOCUMENTS

| 4,383,642 | 5/1983 | Sumikawa et al. | ................. 237/12.3 A |
| 4,515,208 | 5/1985 | Sakurai et al. | ............................. 165/43 |
| 4,892,135 | 1/1990 | Sakurada et al. | ........................ 165/42 |
| 4,898,325 | 2/1990 | Sakrada | ..................................... 165/43 |
| 5,042,566 | 8/1991 | Hildebrand | ............................... 165/42 |
| 5,699,851 | 12/1997 | Saida et al. | ............................... 165/42 |

FOREIGN PATENT DOCUMENTS

| 0 210 548 A2 | 4/1987 | European Pat. Off. . |
| 0 756 955 A2 | 2/1997 | European Pat. Off. . |
| A-1-114507 | 5/1989 | Japan . |
| Y2-4-7019 | 2/1992 | Japan . |

Primary Examiner—William E. Tapolcai
Attorney, Agent, or Firm—Harness, Dickey & Pierce, PLC

[57] ABSTRACT

An air conditioning apparatus includes a seal wall having a seal surface to which one end surface of an air mixing door is contacted in the maximum heating state. A defroster warm air leading passage is constructed by the seal wall, a warm air guide portion and an inner surface of an air conditioning case. The defroster warm air leading passage is formed in a space opposite to the seal surface of the seal wall at a downstream air side of the seal wall. Because cool air hardly flows through the space opposite to the seal surface of the seal wall and the defroster warm air leading passage is formed by effectively using the space, the size of the air conditioning apparatus for a vehicle can be reduced.

14 Claims, 14 Drawing Sheets

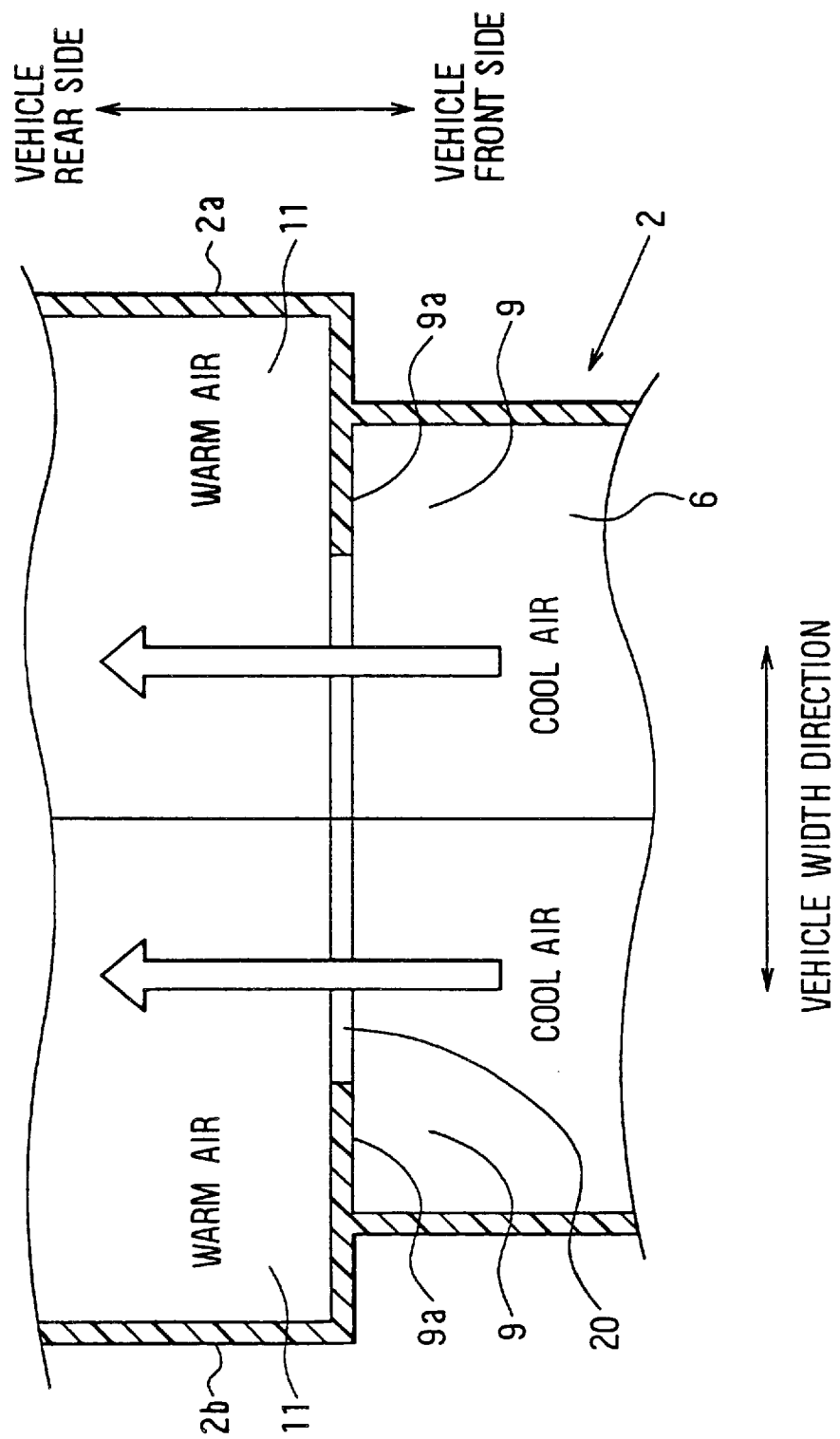

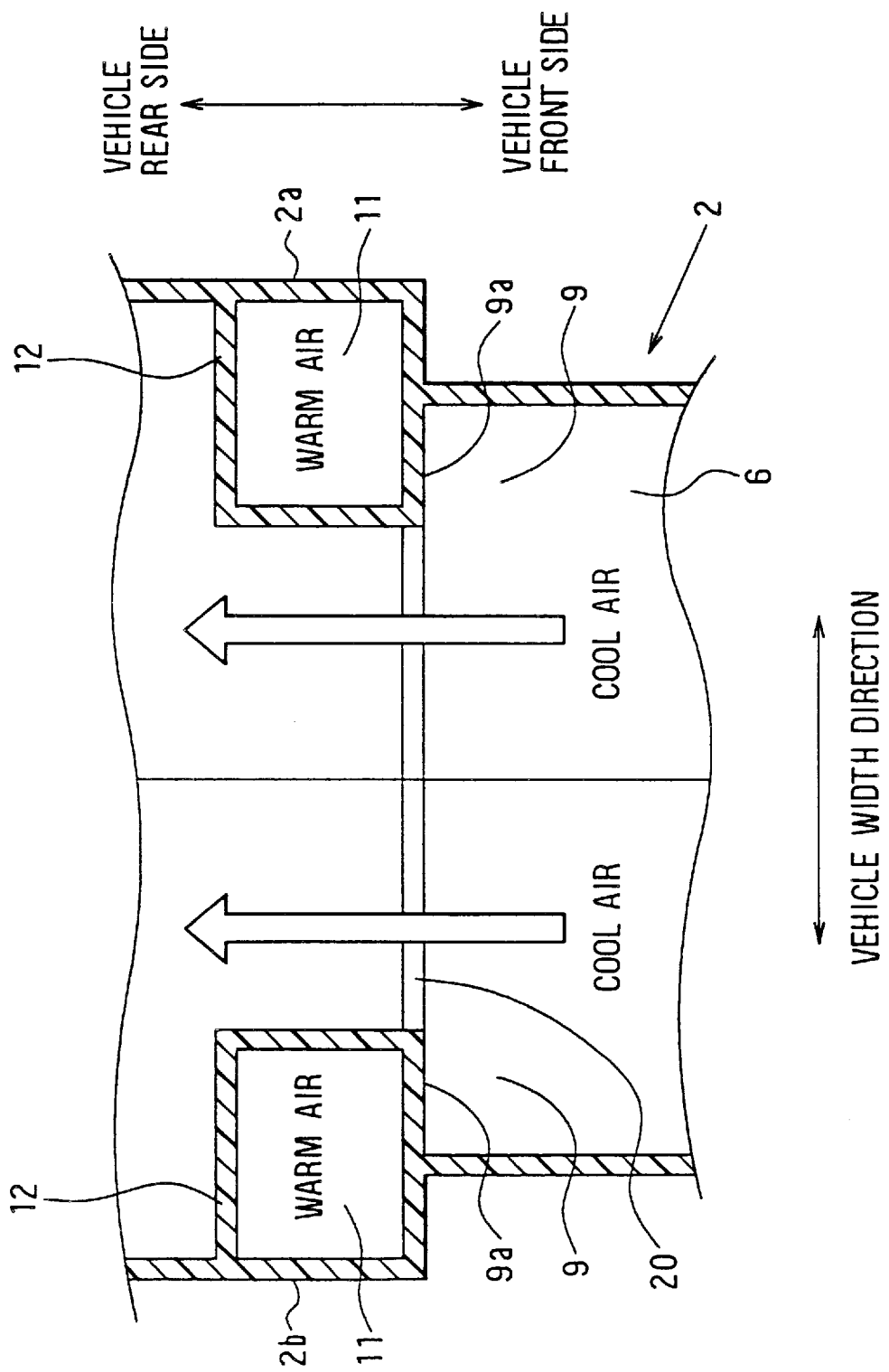

AIR CONDITIONING APPARATUS FOR VEHICLE

CROSS-REFERENCE TO RELATED APPLICATION

This application is related to and claims priorities from Japanese Patent Applications No. 8-155820 filed on Jun. 17, 1996, No. 8-295374 filed on Nov. 7, 1996, and No 8-343408 filed on Dec. 24, 1996, the contents of which are hereby incorporated by reference.

BACKGROUND OF THE INVENTION

1. Field of the Invention

The present invention relates to an air conditioning apparatus for a vehicle, and more particularly a temperature adjustment of the air conditioning apparatus.

2. Description of Related Art

In a conventional air conditioning apparatus for a vehicle as shown in JP-A-1-114507, a temperature of conditioned air blown out from a foot air outlet is higher than a temperature of conditioned air blown out from a defroster air outlet in a foot mode or a foot/defroster mode for blowing out conditioned air from both of the foot air outlet and the defroster air outlet. In the conventional air conditioning apparatus, cool air flowing through a cool air passage and warm air flowing through a warm air passage are mixed together in an air mixing chamber portion, the defroster air outlet is disposed in the air mixing chamber portion at a downstream air side of the cool air passage, and the foot air outlet is disposed in the air mixing chamber portion at a downstream air side of the warm air passage.

In addition, in the air conditioning apparatus, an additional warm air leading passage is formed to increase the temperature of conditioned air blown out from the defroster air outlet to improve an effect for defrosting the windshield of the vehicle.

However, the warm air leading passage is separately formed to project to an outside of an air conditioning unit. Thus, there is a problem that the size of the air conditioning apparatus becomes large by forming the warm air leading passage.

SUMMARY OF THE INVENTION

In view of the foregoing problems, it is an object of the present invention to provide a downsized air conditioning apparatus having a defroster warm air leading passage.

According to present invention, a seal wall is formed at a downstream air side of a cool air passage and a temperature adjustment door to protrude from an inner surface of an air conditioning case, the seal wall forms an opening portion as an outlet of the cool air passage, the temperature adjustment door contacts the seal wall to close the opening portion in the maximum heating mode where air flowing through the air conditioning case is wholly passed through a warm air passage; and a warm air leading passage is formed proximate to the seal wall at a downstream air side of the seal wall. Thus, a temperature of conditioned air blown out from an upper side air outlet passage can be readily increased, and the size of the air conditioning apparatus can be reduced.

Because the warm air leading passage is formed inside the air conditioning case, it can prevent warm air from leaking outside the air conditioning case without complicating the shape of the air conditioning case.

Preferably, the temperature adjustment door includes a first temperature adjustment door for adjusting the amount of air flowing through the cool air passage and a second temperature adjustment door for adjusting the amount of air flowing through the warm air passage, and the first temperature adjustment door contacts the seal wall in the maximum heating mode. Thus, the temperature of conditioned air can be adjusted even if a distance between a cooling heat exchanger and a heating heat exchanger is made small, so that the size of the air conditioning apparatus can be further reduced.

Further, a warm air guide portion for guiding warm air from the warm air passage to the upper side air outlet passage is formed. Therefore, by the warm air guide portion and the seal wall, warm air can be effectively supplied to the upper side air outlet passage.

Preferably, the warm air leading passage is separated from the cool air passage and the warm air passage. Therefore, warm air passed through the warm air leading passage is not mixed with cool air and warm air flowing through the cool air passage and warm air passage, respectively, so that warm air can be effectively supplied to the upper side air outlet passage.

Further, an interruption plate portion is formed at a downstream air side of the warm air guide portion, for interrupting a flow of cool air flowing through the cool air passage. Thus, the temperature of conditioned air supplied to the upper side air outlet passage can be further readily increased. By changing the shape of the interruption portion, the temperature of conditioned air supplied to the upper side air outlet passage can be readily adjusted

BRIEF DESCRIPTION OF THE DRAWINGS

Additional objects and advantages of the present invention will be more readily apparent from the following detailed description of preferred embodiments when taken together with the accompanying drawings, in which:

FIG. 16 is a cross-sectional view showing a modification of the present invention; and FIG. 17 is a cross-sectional view showing another modification of the present invention.

DETAILED DESCRIPTION OF THE PRESENTLY PREFERRED EMBODIMENTS

Figure 1:
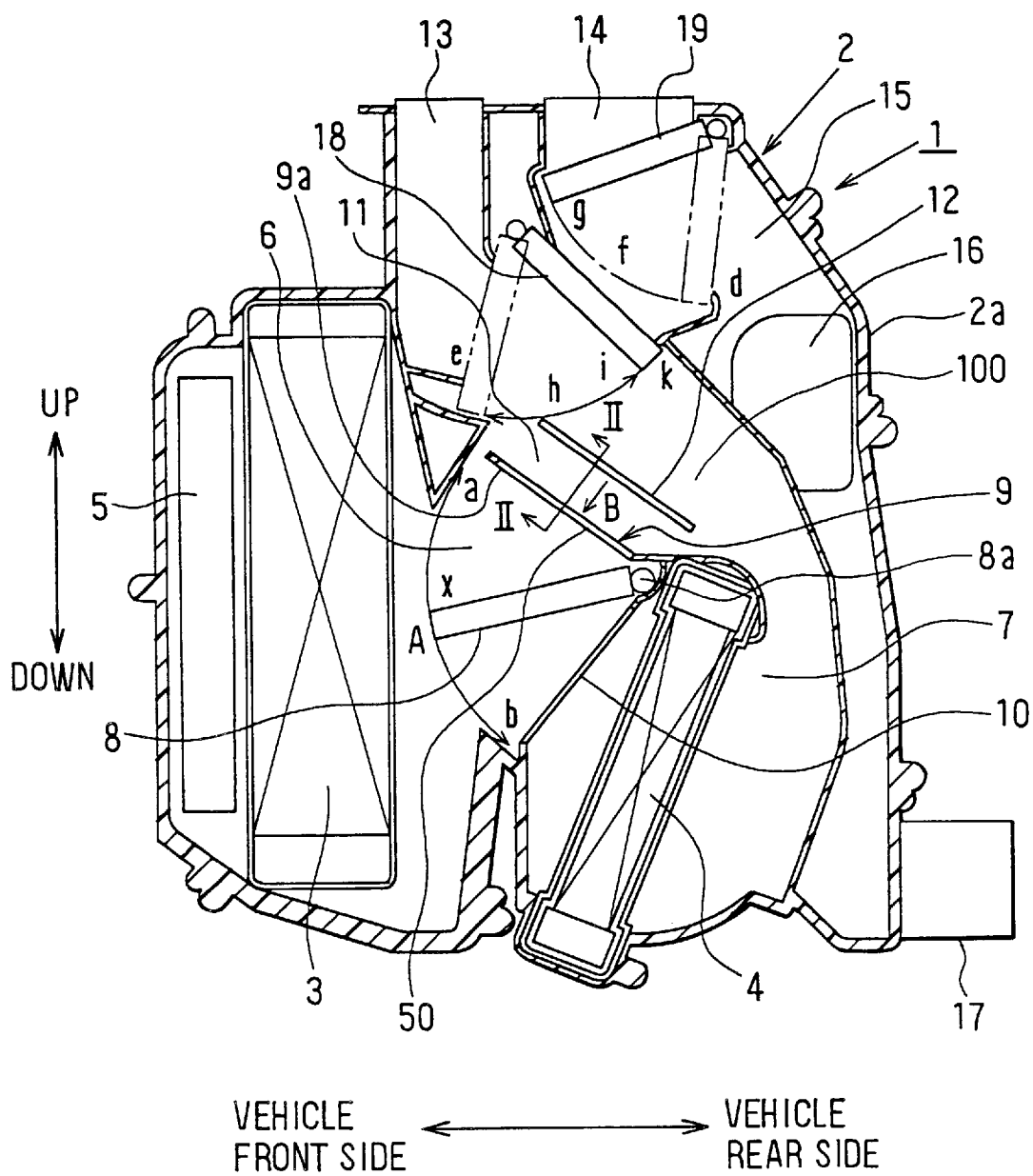
FIG. 1 is a schematic diagram showing an air conditioning apparatus for a vehicle according to first embodiment of the present invention.

Preferred embodiments of the present invention are described hereinafter with reference to the accompanying drawings.

First embodiment of the present invention will be described.

An air conditioning apparatus 1 for a vehicle includes an inside/outside air blowing unit (not shown) and an air conditioning unit 2 having an air conditioning heat exchanger described later.

By the inside/outside air blowing unit, inside air or outside air is selectively blown into the air conditioning unit 2. The inside/outside air blowing unit includes an inside air inlet, an outside air inlet and an inside/outside air switching door for selectively opening or closing the inside air inlet and the outside air inlet. Further, a blower for blowing inside air or outside air from the inside air inlet or the outside air inlet to the air conditioning unit 2 is formed in the inside/outside air blowing unit.

The air conditioning unit 2 is installed in a vehicle at a center portion in a vehicle width direction (i.e., the face-back direction in FIG. 1) and is disposed in series with the inside/outside air blowing unit in the vehicle width direction. The air conditioning unit 2 includes two air conditioning cases 2a and 2b, and the air conditioning cases 2a and 2b are air-tightly connected with each other by a fastening method such as a screws or C-shaped clip to form an air passage for introducing air into a passenger compartment (refer to FIG. 2). In the first embodiment, the two air conditioning cases 2a and 2b are connected to each other in the vehicle width direction shown in FIG. 2, the division surface (i.e., connecting surface) of the two cases 2a and 2b is placed in the up-down direction in FIG. 1, and the hatching portion in FIG. 1 corresponds to the division surface of the air conditioning cases 2a and 2b. Although the hatching is not necessary in FIG. 1, the hatching is performed to easily understand the characteristic portion of the present invention described later.

Within the case of the air conditioning unit 2, an air inlet opening 5 for sucking air blown from the inside/outside air blowing unit is formed. The air conditioning unit 2 includes an evaporator 3 (i.e., cooling heat exchanger) for cooling air sucked from the air inlet opening 5 and a heater core 4 (i.e., heating heat exchanger) for heating air passing therethrough. The evaporator 3 is disposed at an upstream air side of the heater core 4.

Air blown from the blower (not shown) in the inside/outside air blowing unit flows in the vehicle width direction and changes the flow direction within the case of the air conditioning unit 2 through the air inlet opening 5, and further flows through the air conditioning case from the vehicle front side to the vehicle rear side.

The evaporator 3 is a part of a well-known refrigerating cycle, and the explanation of the evaporator 3 is omitted. Further, the heater core 4 is a well-known heating heat exchanger in which engine cooling water is used as a heat source, and the explanation of the heater core 4 is omitted.

As shown in FIG. 1, the heater core 4 is disposed within the case of the air conditioning unit 2 in a part of a downstream side passage of the evaporator 3. Therefore, a cool air passage 6 is formed at the downstream air side of the evaporator 3, and a warm air passage 7 is formed at the downstream air side of the heater core 4. By the cool air passage 6, air cooled in the evaporator 3 bypasses the heater core 4. At a downstream air side of the cool air passage 6 and the warm air passage 7, an air mixing chamber portion 100 for mixing cool air and warm air is formed.

Because the cool air passage 6 and the warm air passage 7 are disposed in the up-down direction in FIG. 1 and the heater core 4 is disposed at a lower portion within the case of the air conditioning unit 2, the cool air passage 6 is formed at an upper side of the warm air passage 7 in the updown direction in FIG. 1. Further, the cool air passage 6 is formed to extend from the vehicle front side to the vehicle rear side.

On the other hand, the warm air passage 7 extends upwardly, and is bent toward a downstream side of a seal wall 9 described later. Therefore, cool air flowing through the cool air passage 6 and warm air flowing through the warm air passage 7 are perpendicularly joined and mixed with each other in the air mixing chamber portion 100.

In the first embodiment, a flow ratio between cool air flowing through the cool air passage 6 and warm air flowing through the warm air passage 7 is adjusted by a temperature adjustment door (i.e., air mixing door 8), thereby a temperature of conditioned air is adjusted. As shown in FIG. 1, the air mixing door 8 for adjusting the temperature of the conditioned air is disposed between a downstream side of the evaporator 3 and an upstream side of the heater core 4. The air mixing door 8 is formed in a plate shape, and adjusts the flow ratio between warm air and cool air to be mixed in the air mixing chamber portion 100. Therefore, the temperature of the conditioned air to be supplied to a passenger compartment can be adjusted to a desired temperature.

Figure 3:
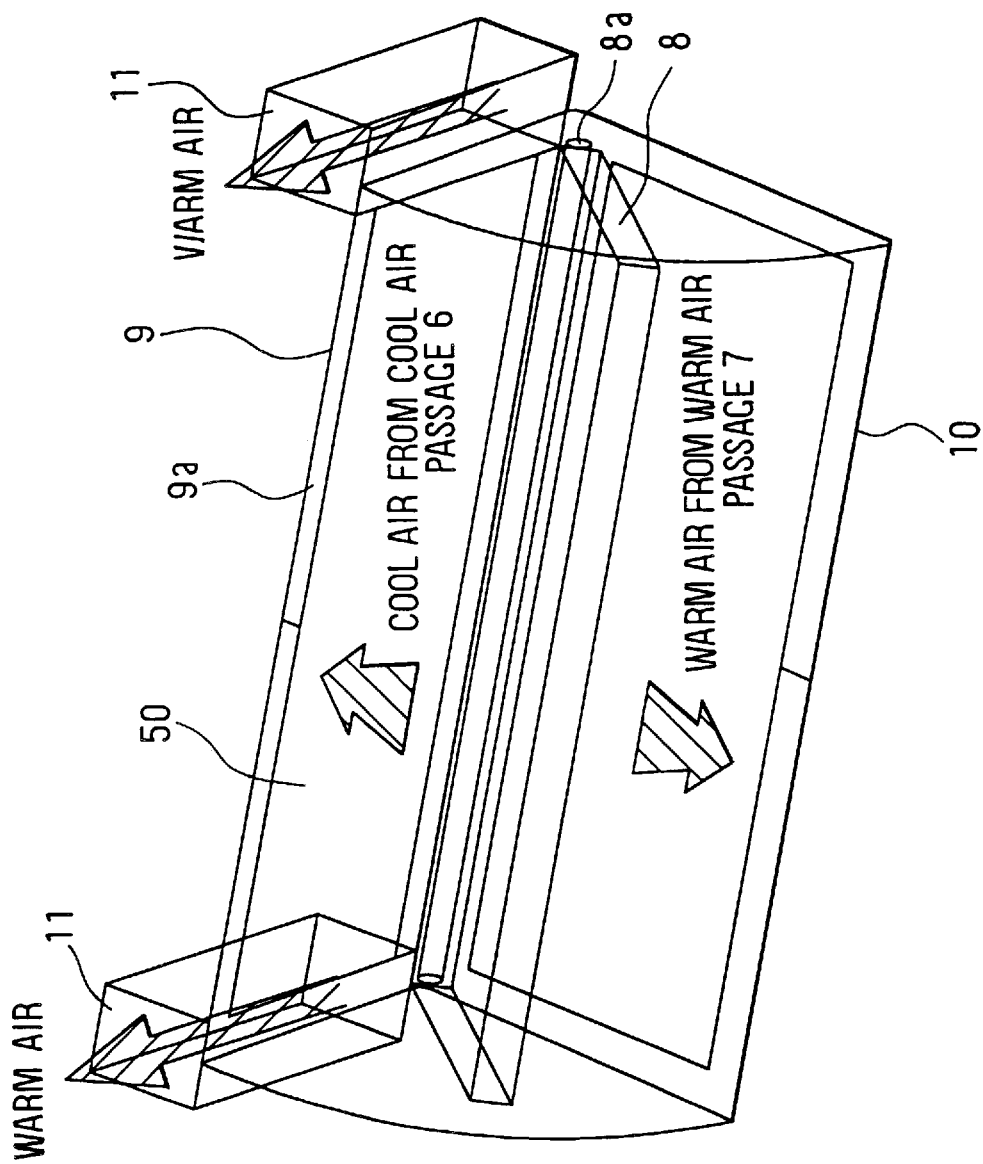
FIG. 3 is a diagrammatic view showing a flow of warm air flowing through a defroster warm air leading passage and a flow of cool air having passed through a cool air passage.

As shown in FIGS. 1 and 3, the air mixing door 8 has the plate shape, a rotational shaft 8a is formed at one end portion of the plate-shaped air mixing door 8. The rotational shaft 8a is rotatably supported within the case of the air conditioning unit 2. The air mixing door 8 is disposed in such a manner that the axial direction of the rotational shaft 8a extends along the face-back direction in FIG. 1 (i.e., the vehicle width direction). Thus, the air mixing door 8 can be rotated in a range shown by an arrow A in FIG. 1. The air mixing door 8 is driven by a servo motor (not shown) connected to the rotational shaft 8a.

Figure 2:
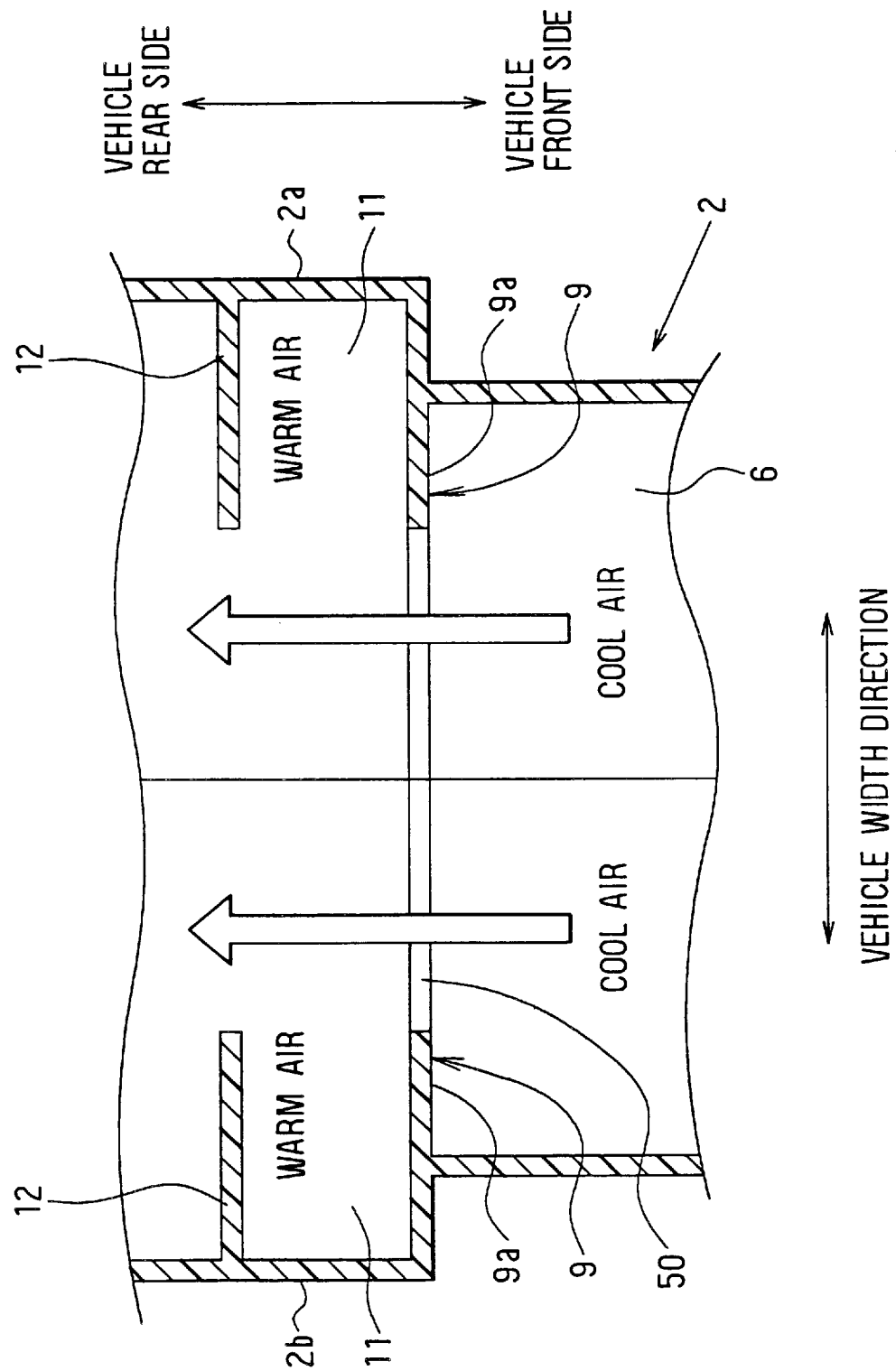
FIG. 2 is a cross-sectional view taken along line II—II in FIG. 1.

The seal wall 9 has a seal surface 9a to which one end surface of the air mixing door 8 can be contacted. The seal wall 9 is formed at a downstream side of the cool air passage 6 and the air mixing door 8. The seal wall 9 is formed integrally with the case of the air conditioning unit 2 to protrude from the inner surface of the case of the air conditioning unit 2. The seal wall 9 is formed in a square frame shape when viewed from B direction shown in FIG. 1 after connecting the two air conditioning cases 2a and 2b (refer to FIG. 3). Thus, as shown in FIGS. 1 through 3, an opening portion 50 framed by the seal wall 9 forms an outlet portion of the cooling air passage 6. Further, the seal wall 9 is formed at a rotational position shown by "a" which is placed at one end side in the air mixing door rotational range shown by "A" in FIG. 1.

In the maximum heating state in which the entire air passed through the evaporator 3 is wholly passed through the heater core 4, the air mixing door 8 contacts the seal wall 9 to prevent cool air from leaking from the cool air passage 6. That is, an end surface of the air mixing door 8 contacts the seal surface 9a of the seal wall 9 so that the opening portion 50 is fully closed. On the plate surface of the air mixing door 9, a seal member such as packing is generally bonded.

A seal wall 10 for contacting another end surface of the air mixing door 8 is formed integrally with the case of the air conditioning unit 2 at a rotational position shown by "b" which is placed at another end side in the rational range shown by "A" in FIG. 1 of the air mixing door 8.

By the seal wall 10, the entire air passed through the evaporator 3 bypasses the heater core 4 in the maximum cooling state. That is, in the maximum cooling state, the seal wall 10 contacts another end surface of the air mixing door 8 to sufficiently close an inlet portion of the warm air passage 7 to prevent cool air flowing through the cool air passage 6 from leaking to the heater core 4. The seal wall 10 has the same shape as the seal wall 9.

As shown in FIG. 2, a defroster warm air leading passage 11 for leading warm air from the warm air passage 7 to a defroster air passage 13 described later is formed near the seal wall 9 at a downstream side of the seal wall 9. That is, the defroster warm air leading passage 11 is formed at a position opposite to the seal surface 9a contacting the air mixing door 8.

The defroster warm air leading passage 11 extends from the vehicle rear side to the vehicle front side along the seal wall 11 as shown in FIG. 1, and is formed perpendicular to the flow direction of cool air flowing through the cool air passage 6.

In the first embodiment, there are provided two defroster warm air leading passages 11 as shown in FIG. 2. The two defroster warm air leading passages 11 are formed at two end portions of the rotational shaft 8a of the air mixing door 8 in the axial direction (i. e., the vehicle width direction) to be perpendicular to the flow direction of cool air flowing through the cool air passage 6 and the flow direction of warm air flowing through the warm air passage 7.

As shown in FIG. 2, the defroster warm air leading passage 11 is formed in such a manner that the air conditioning cases 2a and 2b expand outwardly relative to the cool air passage 6 which is formed at an upstream air side of the seal wall 9. The defroster warm air leading passage 11 is constructed by the seal wall 9, the air conditioning cases 2a and 2b and a warm air guide portion 12 formed in parallel with the seal wall 9 to have a predetermined distance therebetween. The warm air guide portion 12 is formed integrally with the case of the air conditioning unit 2.

Similarly to the seal wall 9, the warm air guide portion 12 protrude from the inner surface of the case of the air conditioning unit 2 in the vehicle width direction in FIG. 2. A top end portion of the warm air guide portion 12 protruding from the inner surface of the case is placed in the same position as a top end portion of the seal wall 9 in the vehicle width direction. Therefore, the flow of cool air passed through the cool air passage 6 is not interrupted by the warm air guide portion 12 so as not to decrease the amount of cool air. Further, the warm air guide portion 12 is formed to be parallel to the seal wall 9 and to extend toward the defroster air passage 13.

At a downstream side of the cooling air passage 6 and the warm air passage 7, air passages 13, 14 and 15 communicating with each corresponding outlet formed in the passenger compartment are respectively formed. Specifically, there are formed a defroster air passage 13 for blowing out conditioned air toward the inside surface of the front windshield, a face air passage 14 for blowing out conditioned air toward the upper half body of a passenger seated on a front seat in the passenger compartment, and a foot air passage 15 for blowing out conditioned air toward the lower half body of a passenger seated on the front seat or the rear seat in the passenger compartment.

By the defroster air passage 13, conditioned air is blown out from an upper side of the passenger compartment near the front windshield. By the face air passage 14, conditioned air is blown out from an upper side in the passenger compartment. Further, by the foot air passage 15, conditioned air is blown out from a lower portion in the passenger compartment.

The defroster air passage 13, the face air passage 14 and the foot air passage 15 are disposed in order from the vehicle front side to the vehicle rear side.

The foot air passage 15 is formed to extend downward in the air conditioning unit 2, and therefore, conditioned air flows through the foot air passage 15 from the upper side toward the down side in the air conditioning unit 2. In the foot air passage 15, there is formed a front seat foot outlet portion 16 for blowing out the conditioned air toward the lower half body of a front seat passenger in the passenger compartment. Further, at a downstream air side of the front seat foot outlet portion 16 in the foot air passage 15, there is formed a rear seat foot outlet portion 17 for blowing out the conditioned air toward the lower half body of a rear seat passenger in the passenger compartment.

By air switching doors 18 and 19, the air passages 13 through 15 are opened or closed, so that the following five operation modes can be selected.

Next, operations of the air switching doors 18 and 19 at the five modes and the flow of conditioned air will be described.

(1) Face Mode

In the face mode, the air switching door 19 is rotated to a position shown by "d" in FIG. 1, so that the face air passage 14 is fully opened and the foot air passage 15 is fully closed. Further, the air switching door 18 is rotated to a position shown by "e" in FIG. 1, so that the defroster air passage 13 is fully closed. Thus, conditioned air adjusted in the air mixing door 8 only flows through the face air passage 14.

(2) Bi-level Mode

In the spring or the autumn season, warm air is blown out toward the lower half body of a passenger in the passenger compartment and cool air is blown out toward the upper half body of the passenger in the passenger compartment in the bi-level mode, thereby performing an operation of "cooling of the head portion and heating of the foot portion" to give a pleasant feeling to the passenger. In the bi-level mode, the temperature of the conditioned air flowing through the face air passage and the temperature of the conditioned air flowing through the foot air passage 15 are different from each other. That is, in the bi-level mode, cool air is supplied to the face air passage 14 and warm air is supplied to the foot air passage 15 at the same time.

In the bi-level mode, the air switching door 19 is rotated to an intermediate position shown by "f" in FIG. 1, thereby opening both of the face air passage 14 and the foot air passage 15. Further, the air switching door 18 is rotated to the position "e", thereby closing the defroster air passage 13. Thus, the conditioned air adjusted in the air mixing door 8 is supplied to both of the face air passage 14 and the foot air passage 15.

(3) Foot Mode

In the foot mode, the air switching door 19 is rotated to a position shown by "g" in FIG. 1, so that the face air passage 14 is fully closed and the foot air passage 15 is fully opened. Further, the air switching door 18 is rotated to an intermediate position shown by "h" in FIG. 1, so that the defroster air passage 10 is opened slightly.

Thus, most (about ninety percent) of the conditioned air adjusted by the air mixing door 8 is supplied to the foot air passage 15 and the other conditioned air is supplied to the defroster air passage 13.

In the foot mode, when the air mixing door 8 is rotated to a rotational position shown by "x" in FIG. 1 (hereinafter referred to as air mixing state), it is necessary to set temperature difference between the upper side and the lower side in the passenger compartment, similarly to the bi-level mode.

Because the foot mode is generally used for heating the passenger compartment, the passenger compartment is sufficiently heated when the air mixing door 8 is in the air mixing state, for example. Therefore, conditioned air blown out to the passenger compartment is not necessary to have a high temperature. An this time, conditioned air supplied to the foot air passage 15 gives a warm feeling to a passenger in the passenger compartment. However, when conditioned air having the same temperature as the conditioned air supplied to the foot air passage 15 is supplied to the defroster air passage 13, the conditioned air can reach the head portion of a passenger along the front windshield, thereby giving unpleasant feeling to the passenger.

Thus, in an air conditioning apparatus for a vehicle, it is generally necessary that the conditioned air to be supplied to the defroster air passage 13 has a temperature lower than that of the conditioned air to be supplied to the foot air passage 15 and more than a predetermined temperature so as to increase the effect for defrosting the front windshield of the vehicle.

However, when the temperature difference between the upper side and lower side in the passenger compartment is set in this case, the temperature of the conditioned air to be supplied to the defroster air passage 13 is easily remarkably decreased from characteristics of the air conditioning unit 2, and therefore, there is a problem that a defrosting performance of the front windshield deteriorates. It is because the defroster air passage 13 is formed at a downstream air side of the cool air passage 6 in the air mixing chamber portion 100 as shown in FIG. 1.

However, in the first embodiment, by the defroster warm air leading passage 11, the above-described problem can be resolved.

When the air mixing door 8 is in the air mixing state, cool air passed through the cool air passage 6 is blown toward the opening portion 50 framed by the seal wall 9 as shown in FIG. 3.

In the first embodiment, by effectively using a space near the seal wall 9 at a downstream side of the seal wall 9, the defroster warm air leading passage 11 is formed. Thus, warm air from the warm air passage 7 is blown into the defroster warm air leading passage 11 to bypass the air mixing chamber portion 100 and is supplied to the defroster air passage 13 through the defroster warm air leading passage 11. As a result, the temperature of conditioned air to be supplied to the defroster air passage 13 can be readily increased in the air mixing state, and the size of the air conditioning unit 2 of the air conditioning apparatus 1 can be reduced.

In the first embodiment, by the warm air guide portion 12 and the seal wall 9, warm air flowing through the warm air passage 7 is effectively supplied to the defroster air passage 13. Therefore, the temperature of conditioned air to be supplied to the defroster air passage 13 can be readily increased.

As shown in FIG. 2, the defroster warm air leading passage 11 is formed by expanding the case of the air conditioning unit 2 outwardly in the vehicle width direction as compared with the opening portion 50. Therefore, even if the amount of the conditioned air flowing through the defroster warm air leading passage 11 becomes large, cool air flowing through the cool air passage 6 and warm air flowing through the defroster warm air leading passage 11 are hardly interfered with each other so that warm air can be surely supplied to the defroster warm air leading passage 11.

Further, because the defroster warm air leading passage 11 is formed integrally with the case of the air conditioning unit 2 without separately forming a guide for leading warm air into the defroster air passage 13, the number of parts of the air conditioning unit 2 can be decreased. In the first embodiment, because two defroster warm air leading passages 11 are formed, the amount of the warm air can be sufficiently ensured, and the temperature of the conditioned air flowing through the defroster air passage 13 can be readily increased.

In the first embodiment, because the defroster warm air leading passage 11 is formed inside of the air conditioning cases 2a and 2b, it can prevent warm air from leaking outside the air conditioning cases 2a and 2b without complicating the shapes of the air conditioning cases 2a and 2b.

(4) Foot/Defroster Mode

In the foot/defroster mode, the air switching door 19 is rotated to the position "g", the face air passage 14 is fully closed and the foot air passage 15 is opened. Further, the air switching door 18 is rotated to an intermediate position shown by "i" in FIG. 1, so that the defroster air passage 13 is opened.

Thus, conditioned air adjusted by the air mixing door 8 is supplied to both of the defroster air passage 13 and the foot air passage 15. In the foot/defroster mode, approximately half amount of the conditioned air adjusted by the air mixing door 8 is supplied to the foot air passage 15 and the other half amount of the conditioned air is supplied to the defroster air passage 13. The foot/defroster mode of the first embodiment has the same effect as the foot mode.

(5) Defroster Mode

In the defroster mode, the air switching door 18 is rotated to a position shown by "k" in FIG. 1, so that the defroster air passage 13 is fully opened and the face air passage 14 and foot air passage 15 are fully closed. Thus, the conditioned air adjusted by the air mixing door 8 is wholly supplied to only the defroster air passage 13.

Second embodiment of the present invention will be described.

In the second embodiment, by using two temperature adjustment doors 20 and 21 (i.e., cool air door 20 and warm air door), the temperature of conditioned air is adjusted. In the second embodiment, the same reference numerals are used for the same structures as in the first embodiment. Further, in the second embodiment, a method for forming the defroster warm air leading passage 11 is different from that of the first embodiment.

Figure 4:
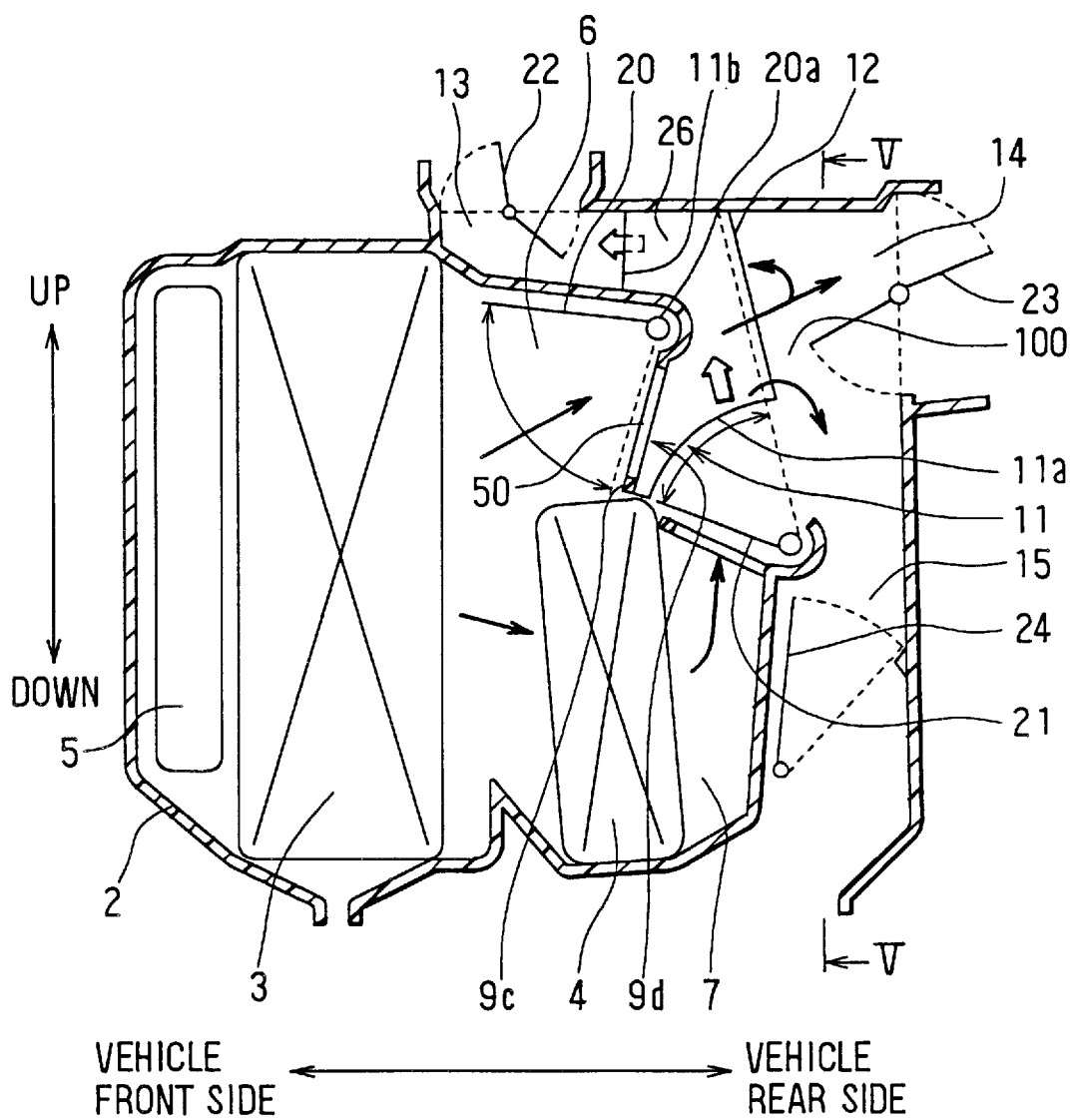
FIG. 4 is a schematic diagram showing an air conditioning apparatus for a vehicle according to second embodiment of the present invention.

FIG. 4 is a schematic diagram showing an air conditioning apparatus 1 for a vehicle according to the second embodiment of the present invention. In FIG. 4, hatching is performed on only the case of the air conditioning unit 2 to simplify the structure shown in FIG. 4. In the second embodiment, three air switching doors 22 through 25 are formed in the air passages 13 through 15, respectively, and five air-blowing modes can be respectively selected by the air switching doors 22 through 25.

In the second embodiment, the temperature of conditioned air is adjusted by the cool air door 20 for adjusting the amount of cool air flowing through the cool air passage 6 and the warm air door 21 for adjusting the amount of warm air flowing through the warm air passage 7.

When the cool air door 20 is rotated to a position shown by a full line in FIG. 4 to fully open the cool air passage, the warm air door 21 is rotated to a position shown by a full line in FIG. 4 to fully close the warm air passage 7, and therefore, cool air passed through the evaporator 3 is wholly supplied to the cool air passage 6 so that the air conditioning apparatus 1 becomes in the maximum cooling state.

When the cool air door 20 is rotated to a position shown by a dotted line in FIG. 4 to wholly close the cool air passage 6, the warm air door 21 is in a rotational position shown by a dotted line in FIG. 4 to wholly open the warm air passage 7, and therefore, cool air passed through the evaporator 3 is wholly passed through the heater core 4 and is wholly supplied to the warm air passage 7 so that the air conditioning apparatus 1 becomes in the maximum heating state.

In the second embodiment, the cool air door 20 and the warm air door 21 are made in the air mixing state, and the temperature of conditioned air is adjusted by adjusting the amount of cool air flowing through the cool air passage 6 and the amount of warm air flowing through the warm air passage 7.

In the second embodiment, because the distance between the evaporator 3 and the heater core 4 is made smaller, the size of the air conditioning apparatus 1 in the vehicle front-rear direction is made smaller as compared with the first embodiment.

As shown in FIG. 4, the cool air door 20 is disposed at an upper portion of the heater core 4, the temperature of conditioned air is adjusted by the cool air door 20 and warm air door 21. At a downstream side of the cool air door 20, a seal wall 9d having a seal surface 9c is formed for separating the cool air passage 6. The seal wall 9d is formed to protrude from the inner surface of the case of the air conditioning case 2 and is formed in a frame shape when viewed from the left-right direction in FIG. 4. The opening portion 50 is framed by the seal wall 9d similarly to the first embodiment. Thus, in the maximum heating state, the cool air door 20 closes the opening portion 50.

Figure 5:
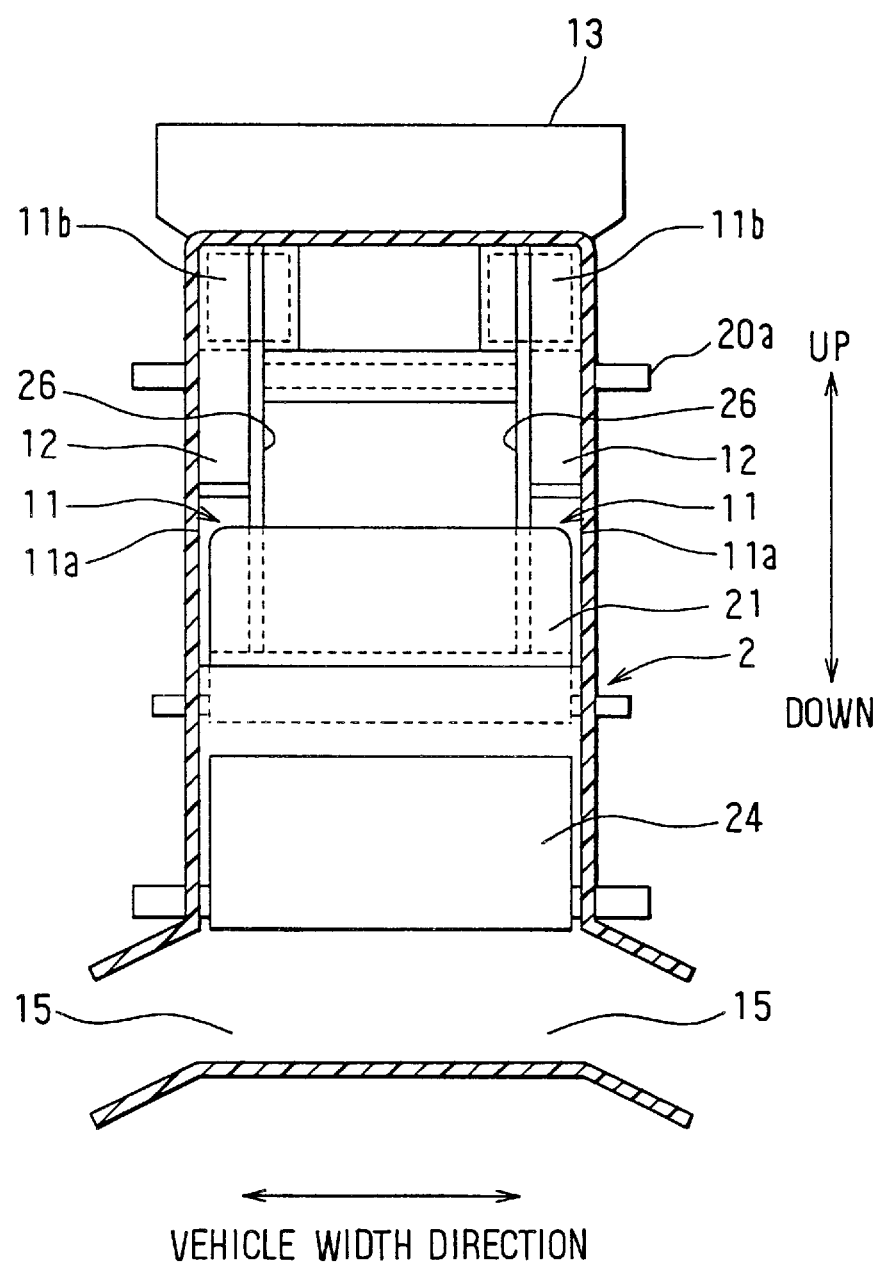
FIG. 5 is a cross-sectional view taken along line V—V in FIG. 4.

As shown in FIG. 5, the defroster warm air leading passage 11 of the second embodiment is formed by the above-described warm air guide portion 12, the inner wall of the case of the air conditioning unit 2 and a plate portion 26 as a guide portion. Thus, the defroster warm air leading passage 11 is separated from the cool air passage 6 and the warm air passage 7. The plate portion 26 is fitted and fixed on the inner surface of the case of the air conditioning unit 2 by fitting means such as a vis.

AS shown in FIG. 4 and 5, a warm air suction opening 11a is formed at one end side of the defroster warm air leading passage 11 near an outlet portion of the warm air passage 7. The defroster warm air leading passage 11 is formed to extend upwardly. The defroster warm air leading passage 11 further extends toward the vehicle front side (i.e., the defroster air passage 13 side) after extending upwardly. At another end side of the defroster warm air leading passage 11, a warm air blowing portion 11b is formed near the defroster air passage 13.

In the foot mode or the foot/defroster mode, when the cool air door 20 and the warm air door 21 are rotated in the air mixing state, a part of warm air passed through the warm air passage 7 flows through the defroster warm air leading passage 11 in which cool air flowing through the cool air passage 6 is not mixed into the warm air, and is supplied to the defroster air passage 13.

Figure 7:
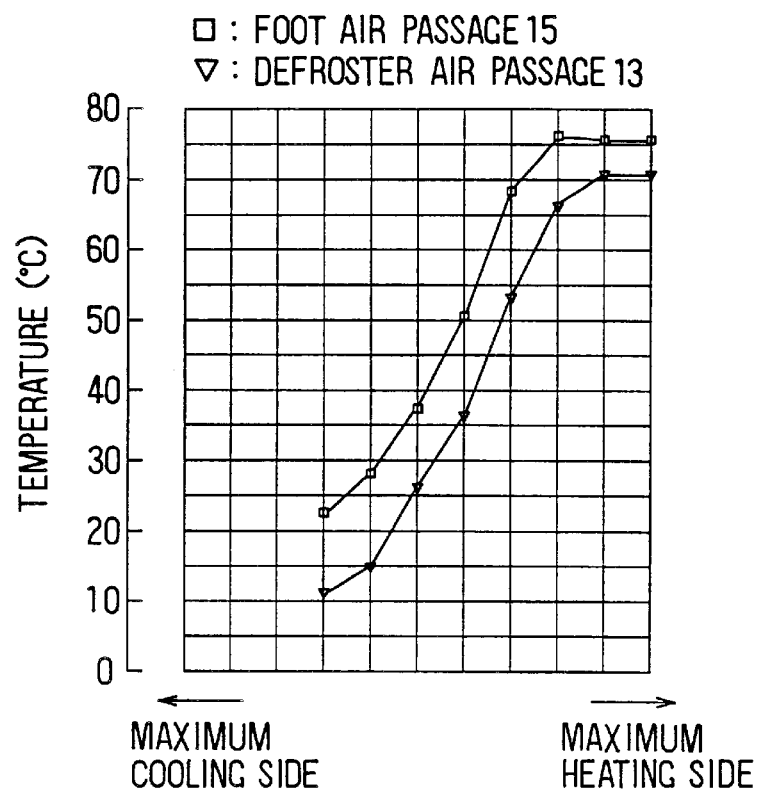
FIG. 7 is a graph showing a temperature of conditioned air blown into a defroster air passage and a temperature of conditioned air blown into a foot air passage when a defroster warm air leading passage of the second embodiment is formed.
Figure 8:
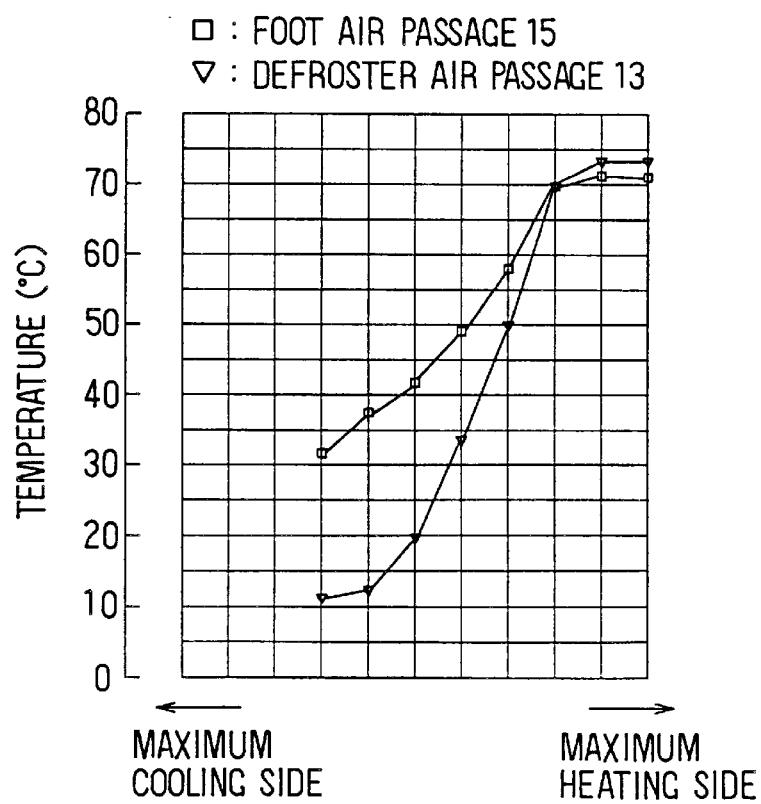
FIG. 8 is a graph showing a temperature of conditioned air blown into the defroster air passage and a temperature of conditioned air blown into the foot air passage when the defroster warm air leading passage of the second embodiment is not formed.

FIG. 7 shows a temperature of conditioned air to be blown out from each of the defroster air passage 13 and the foot air passage 15 when the defroster warm air leading passage 11 is formed. FIG. 8 shows a temperature of conditioned air to be blown out from each of the defroster air passage 13 and the foot air passage 15 when the defroster warm air leading passage 11 is not formed. In FIGS. 7 and 8, the abscissa shows rotational positions when the cool air door 20 and the warm air door 21 are rotated from the maximum cooling state to the maximum heating state in the above-described air mixing state.

As shown in FIG. 7, when the defroster warm air leading passage 11 is formed and each of the cool air door 20 and the warm air door 21 is rotated to "S" position, the temperature of conditioned air supplied to the foot air passage 15 is about 37° C., the temperature of conditioned air supplied to the defroster air passage 13 is about 26° C., and the temperature difference therebetween is 11° C.

On the other hand, as shown in FIG. 8, when the defroster warm air leading passage 11 is not formed and each of the cool air door 20 and the warm air door 21 is rotated to the "S" position, the temperature of conditioned air supplied to the foot air passage 15 is about 42° C., the temperature of conditioned air supplied to the defroster air passage 13 is about 20° C., and the temperature difference therebetween is 22° C.

In the second embodiment, the same effect as the first embodiment is provided. Further, in the second embodiment, because the defroster warm air leading passage 11 is partitioned from the cool air passage 6 and the warm air passage 7, warm air flowing through the defroster warm air leading passage 11 is not mixed with cool air flowing through the cool air passage 6. As a result, warm air having a high temperature can be readily accurately supplied to the defroster air passage 13.

Further, by a pair of plate portions 26, the temperature of conditioned air to be supplied to the defroster air passage 13 can be readily adjusted.

Figure 6:
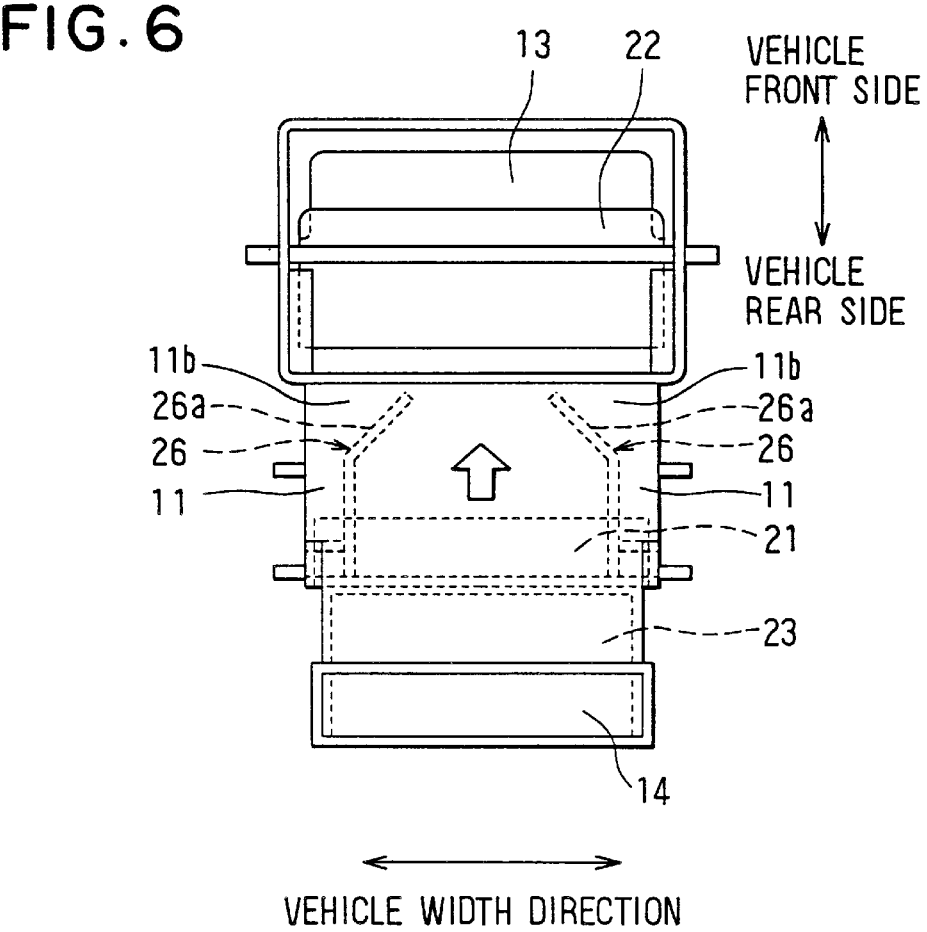
FIG. 6 is a top perspective view of FIG. 4.

As shown in FIG. 6, by bending downstream end portions of the plate portions 26, the area of the defroster warm air leading passage 11 is increased. In the foot mode or the foot/defroster mode, when the cool air door 20 and the warm air door 21 are rotated in the air mixing state, cool air passed through the cool air passage 6 flows between the plate portions 26 as shown by arrow in FIG. 6. Therefore, the downstream end portions of the plate portions 26 are used as interruption portions 26a interrupting the flow of cool air from the cool air passage 6.

Thus, by adjusting the bent angle (i.e., the shape) of the interruption portion 26a, the temperature of conditioned air to be supplied to the defroster air passage 13 can be readily adjusted.

Third embodiment of the present invention will be described.

In the third embodiment, the shape of the plate portion 26 is different from that in the second embodiment, and the same reference numerals are used for the same structures as in the second embodiment.

Figure 9:
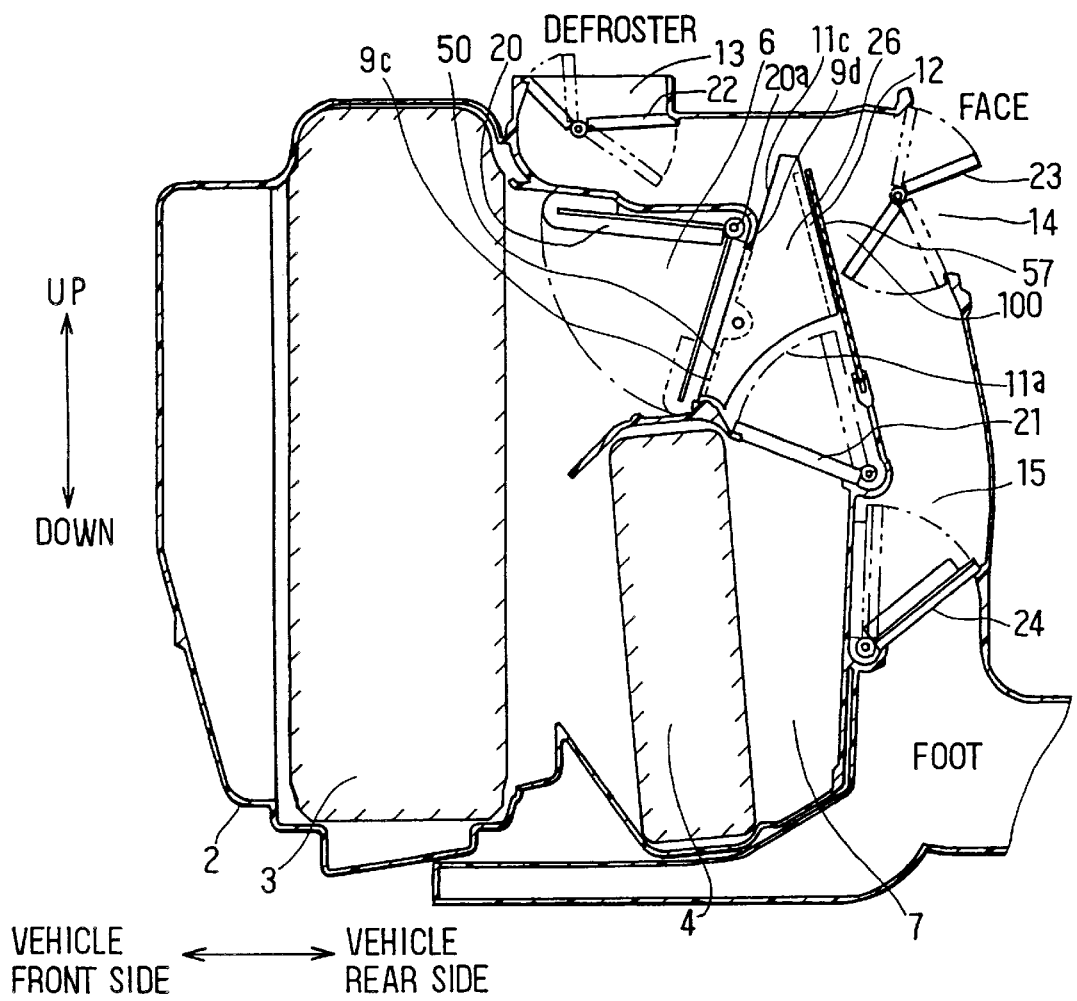
FIG. 9 is a schematic diagram showing an air conditioning apparatus for a vehicle according to third embodiment of the present invention.

FIG. 9 is a schematic diagram showing an air conditioning apparatus for a vehicle according to the third embodiment of the present invention. As shown in FIG. 9, the interruption portion 26a is not formed, and a reticulate member 57 is formed in the air mixing chamber portion 100 in the second embodiment.

The reticulate member 57 is made of metal such as stainless steel and is formed in a flat shape. That is, the flat surface of the reticulate member 57 is formed reticulately. By the reticulate member 57, noise caused by air flow can be decreased.

Figure 10:
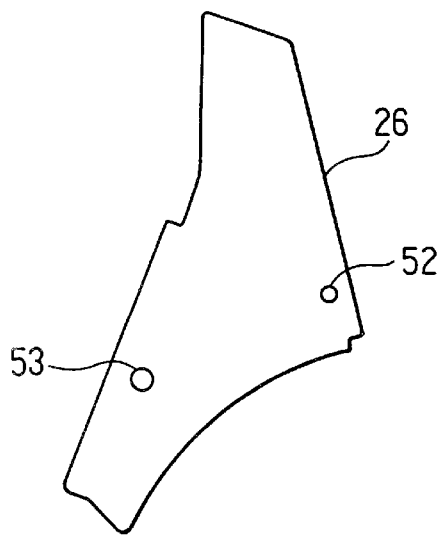
FIG. 10 is a plan view showing a plate portion according to the third embodiment.
Figure 11:
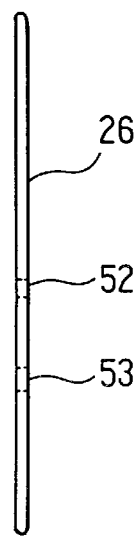
FIG. 11 is a side view showing the plate portion according to the third embodiment.

As shown in FIGS. 10 and 11, the plate portion 26 is formed in a flat shape, a guide hole 52 and a vis hole 53 are formed in the plate portion 26. A guide pin 51 described later is inserted in the guide hole 52, and a vis 54 described later is inserted in the vis hole.

Figure 12:
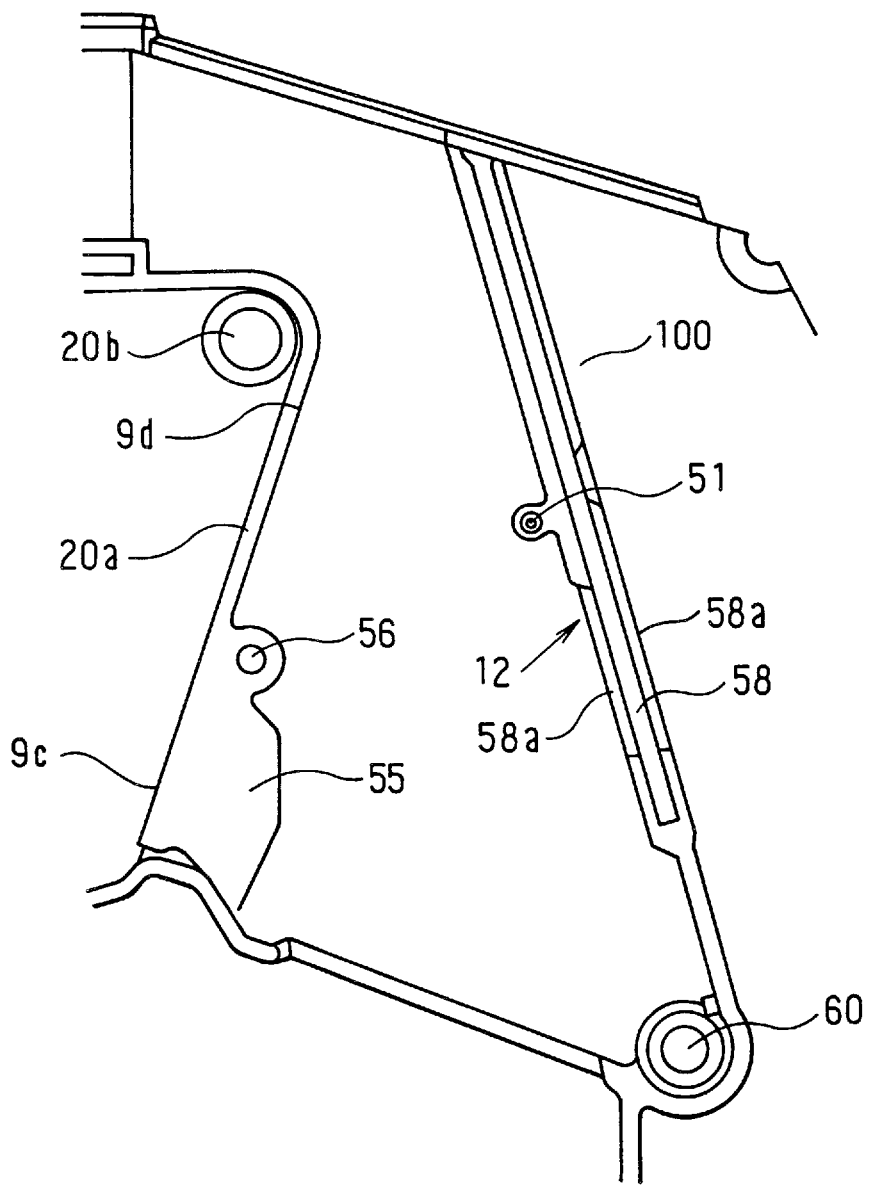
FIG. 12 is a diagrammatic view showing an inner structure of an air conditioning case after removing the plate portion of the third embodiment.

FIG. 12 shows an inner structure of the case of the air conditioning unit 2 after removing the plate portion 26 from the case. As shown in FIG. 12, a pedestal portion 55 is formed on the seal wall 9d placed at an axial direction of a rotational shaft 20a of the cool air door 20. The pedestal portion 55 is used as a pedestal of the plate portion 26. A screw hole 56 is formed in the pedestal portion 55, the vis 54 is screwed in the screw hole 56.

A groove portion 58 for holding the reticulate member 57 is formed by two protrusion portions 58a protruding from the inner surface of the case of the air conditioning unit 2. The reticulate member 57 is inserted into the groove portion 58 between the protrusion portions 58a from the upper side toward the lower side in FIG. 12.

A top end portion of the protrusion portion 58a placed at the left side in FIG. 12 is placed on the same plane as a pedestal surface of the pedestal portion 55. The left side protrusion portion 58a in FIG. 12 functions as the warm air guide portion 12 of the second embodiment. The guide pin 51 is formed integrally with the left side protrusion portion to protrude to the paper face side in FIG. 12. The rotational shaft 20a is inserted into a shaft hole 20b, and a rotational shaft of the warm air door 21 is inserted into a shaft hole 60.

Figure 13:
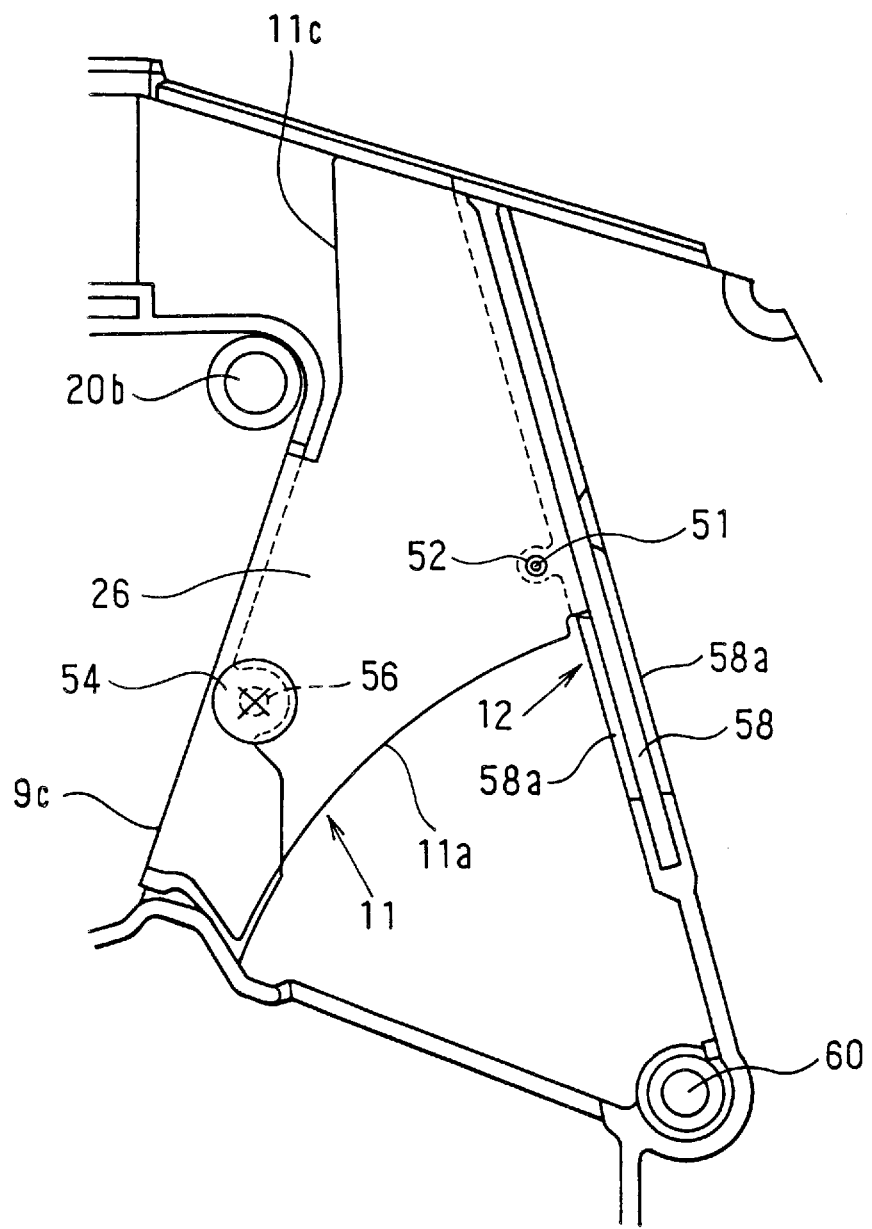
FIG. 13 is a diagrammatic view showing the inner structure of the air conditioning case after attaching the plate portion of the third embodiment.

As shown in FIG. 13, the guide pin 51 is inserted into the guide hole 52 formed on the plate portion 26, so that the plate portion 26 is installed in the inner surface of the case of the air conditioning unit 2. Then, the vis 54 is screwed in the vis hole 56 so that the plate portion 26 is fixed on the case of the air conditioning unit 2. Thus, the defroster warm air leading passage 11 of the third embodiment is formed by the inner surface of the air conditioning case, the seal wall 9c and the warm air guide portion 12 (i.e., the left side protrusion portion 58a).

As a result, the third embodiment has the same effect as the second embodiment. Further, two plate portions 26 are respectively formed at the two end portions of the rotational shaft 20a in the axial direction. Because the case of the air conditioning unit 2 in the second embodiment or the third embodiment has a left-right symmetric structure as shown in FIG. 5, a common plate portion 26 can be used in the left and right sides of the air conditioning unit 2.

Fourth embodiment of the present invention will be described.

In the fourth embodiment, the present invention is employed in an air conditioning apparatus 1 in which a temperature of conditioned air blown to a driver's seat side and a temperature of conditioned air blown to a passenger's seat side next to the driver's seat are independently adjusted. Further, the air conditioning apparatus 1 is installed in a vehicle having a left steering wheel.

Figure 14:
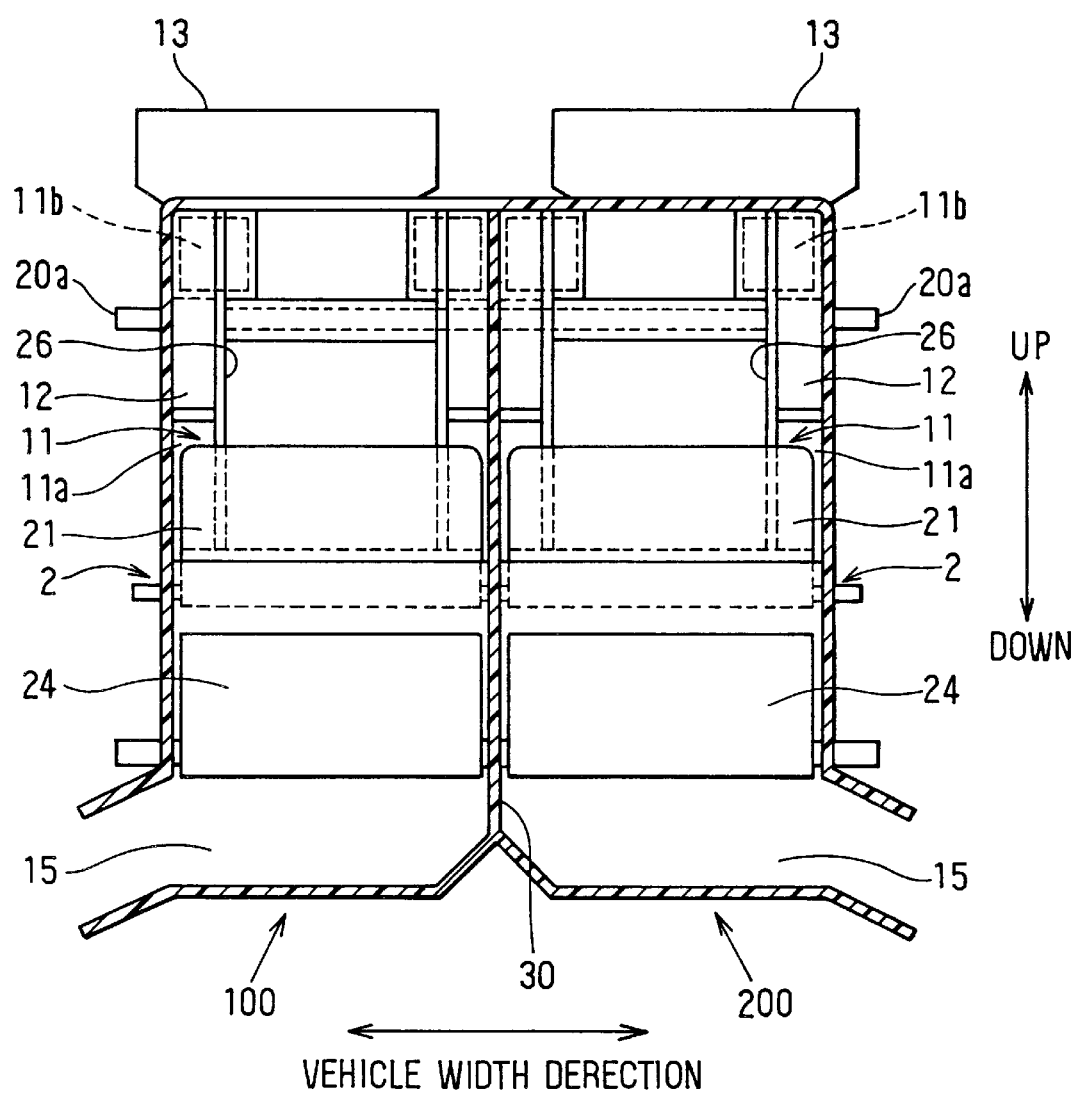
FIG. 14 is a schematic diagram showing an air conditioning apparatus for a vehicle according to fourth embodiment of the present invention.
Figure 15:
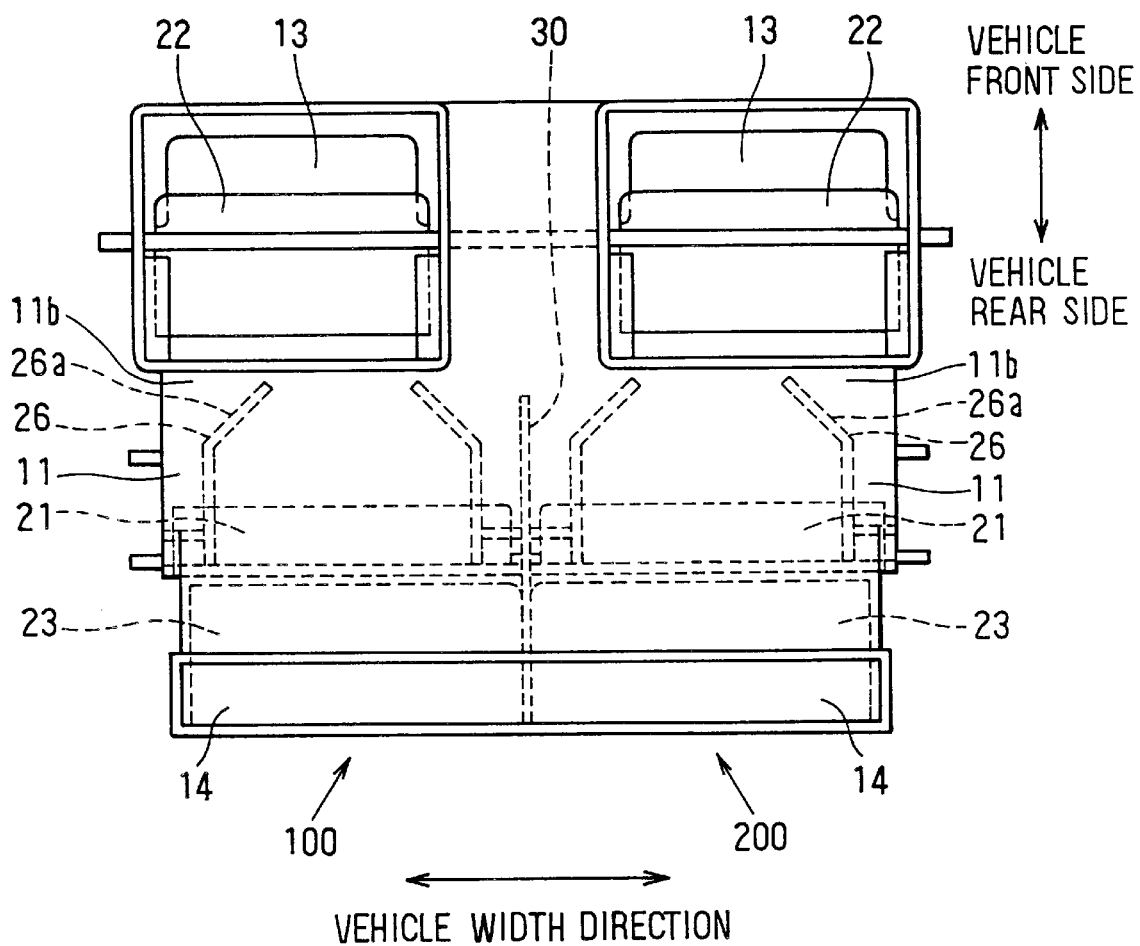
FIG. 15 is a schematic diagram showing an air conditioning apparatus for a vehicle according to the fourth embodiment of the present invention.

As shown in FIGS. 14 and 15, the air conditioning unit 2 of the fourth embodiment is formed by combining the air conditioning unit 2 of the second embodiment in series in the vehicle width direction. The structure shown in FIG. 14 is formed by combining the structure shown in FIG. 5 in series in the vehicle width direction. The structure shown in FIG. 15 is formed by combining the structure shown in FIG. 6 in series in the vehicle width direction. In the fourth embodiment, the same reference numerals are used for the same structures as in the second embodiment.

In the fourth embodiment, by a partition wall 30, the case of the air conditioning unit 2 shown in FIGS. 14 and 15 is partitioned into an air passage 100 of the driver's seat side and an air passage 200 of the passenger's seat side next to the driver's seat.

The defroster air passage 13 disposed at the right side in FIGS. 14 and 15 is used for blowing out conditioned air toward an inner surface of the front windshield at the passenger's seat side next to the driver's seat. On the other hand, the defroster air passage 13 disposed at the left side in FIGS. 14 and 15 is used for blowing out conditioned air toward an inner surface of the front windshield at the driver's seat side.

As shown in FIG. 15, the partition wall 30 is broken halfway so that the left and right defroster air passages 13 are communicated with each other. In the fourth embodiment, although it is possible to independently blow out conditioned air having different temperature toward the front windshield at the driver's seat side and the passenger's seat side next to the driver's seat, the effect for defrosting the front windshield of the vehicle at the driver's seat side is different from that at the passenger's seat side next to the driver's seat when the conditioned air is independently blown out.

Thus, in the fourth embodiment, conditioned air flowing through the two defroster air passages 13 is mixed to have an uniform temperature, and the mixed air is blown out toward the inner surface of the front windshield to have an uniform effect for defrosting the front windshield of the vehicle.

In the above-described embodiments, the warm air guide portion 12 is formed. However, as shown in FIG. 16, the air conditioning cases 2a and 2b placed at a downstream side of the seal wall 9 may be formed to expand outwardly in the vehicle width direction without forming the warm air guide portion 12.

Further, the defroster warm air leading passage 11 of the first embodiment may be formed completely independently formed as shown in FIG. 17.

In the above-described embodiments, the effect due to the defroster warm air leading passage 11 is mainly described when the operation mode is in the foot mode or the foot defroster mode. However, the present invention may be used for performing the operation of "cooling of the head portion and heating of the foot portion" in the bi-level mode.

Further, in the above-described embodiments, the defroster warm air leading passage 11 is formed by the seal wall 9. However, the defroster warm air leading passage 11 may be formed without using the seal wall 9. That is, the defroster warm air leading passage 11 may be formed at a more downstream side of the seal wall 9.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An air conditioning apparatus for a vehicle having a passenger compartment, comprising:

a case having an air passage for introducing conditioned air to said passenger compartment, said air passage including: a cool air passage through which cool air flows, a warm air passage through which warm air flows, an upper side air outlet passage for introducing conditioned air into an upper side of said passenger compartment, a lower side air outlet passage for introducing conditioned air into a lower side of said passenger compartment, and a warm air leading passage for leading warm air from said warm air passage to said upper side air outlet passage;

a temperature adjustment door for adjusting a flow ratio of air flowing through said cool air passage and air flowing through said warm air passage to control a temperature of conditioned air supplied to said passenger compartment; and a seal wall formed in said case to protrude from an inner surface of said case at a downstream air side of said cool air passage and said temperature adjustment door to form an outlet opening portion of said cool air passage, wherein:

said temperature adjustment door contacts said seal wall to close said outlet opening portion in the maximum heating mode where air flowing through said case is wholly passed through said warm air passage; and said warm air leading passage is formed proximate to said seal wall at a downstream air side of said seal wall.

2. An air conditioning apparatus according to claim 1, further comprising:

a cooling heat exchanger disposed at an upstream side of said cool air passage, for cooling air passed therethrough;

a heating heat exchanger for heating air cooled by said cooling heat exchanger, disposed at a downstream side of said cooling heat exchanger to close a part of said cool air passage.

3. An air conditioning apparatus according to claim 1, wherein:

said cool air passage and said warm air passage are formed vertically in such a manner that said cool air passage and said warm air passage are disposed upward and downward, respectively.

4. An air conditioning apparatus according to claim 1, wherein:

said temperature adjustment door includes a first temperature adjustment door for adjusting the amount of air flowing through said cool air passage and a second temperature adjustment door for adjusting the amount of air flowing through said warm air passage; and said first temperature adjustment door contacts said seal wall in the maximum heating mode.

5. An air conditioning apparatus according to claim 1, wherein:

said warm air passage is bent toward a downstream side of said seal wall.

6. An air conditioning apparatus according to claim 1, wherein:

said warm air leading passage is formed by said seal wall.

7. An air conditioning apparatus according to claim 6, further comprising:

a warm air guide portion for guiding warm air from said warm air passage to said upper side air outlet passage.

8. An air conditioning apparatus according to claim 7, wherein:

said warm air guide portion is formed to be parallel to said seal wall.

9. An air conditioning apparatus according to claim 7, wherein:

said warm air leading passage is formed by said seal wall, said warm air guide portion and said inner surface of said case.

10. An air conditioning apparatus according to claim 1, wherein:

said warm air leading passage is separated from said cool air passage and said warm air passage.

11. An air conditioning apparatus according to claim 7, further comprising:

an interruption plate portion formed at a downstream side of said warm air guide portion, for interrupting a flow of cool air flowing through said cool air passage.

12. An air conditioning apparatus according to claim 1, wherein:

said temperature adjustment door has a shaft for rotating said temperature adjustment door; and said warm air leading passage is respectively formed at two end side of said shaft in an axial direction.

13. An air conditioning apparatus for a vehicle having a passenger compartment, comprising:

a case having an air passage for introducing conditioned air to said passenger compartment, said air passage including: a cool air passage through which cool air flows, a warm air passage through which warm air flows, an upper side air outlet passage for introducing conditioned air into an upper side of said passenger compartment, a lower side air outlet passage for introducing conditioned air into a lower side of said passenger compartment, and a warm air leading passage for leading warm air from said warm air passage to said upper side air outlet passage;

a temperature adjustment door for adjusting a temperature of conditioned air by adjusting a flow ratio of air flowing through said cool air passage and air flowing through said warm air passage; and a seal wall formed to protrude from an inner surface of said case, wherein:

said seal wall contacts said temperature adjustment door in the maximum heating mode where air flowing through said case is wholly passed through said warm air passage; and said warm air leading passage is formed proximate to said seal wall at a downstream air side of said seal wall.

14. An air conditioning apparatus for a vehicle having a passenger compartment, comprising:

a case having an evaporator, a heater and an air passage for introducing conditioned air to said passenger compartment, said air passage including: a cool air passage disposed downstream of said evaporator through which cool air flows, a warm air passage disposed downstream of said heater through which warm air flows, an upper side air outlet passage for introducing conditioned air into an upper side of said passenger compartment, a lower side air outlet passage for introducing conditioned air into a lower side of said passenger compartment, and a warm air leading passage for leading warm air from said warm air passage to said upper side air outlet passage;

a temperature adjustment door for adjusting a flow ratio of air flowing through said cool air passage and air flowing through said warm air passage to control a temperature of conditioned air supplied to said passenger compartment; and a seal wall formed in said case to protrude from an inner surface of said case at a downstream air side of said cool air passage and said temperature adjustment door to form an outlet opening portion of said cool air passage, wherein:

said temperature adjustment door contacts said seal wall to close said outlet opening portion in the maximum heating mode where air flowing through said case is wholly passed through said warm air passage; and said warm air leading passage is formed proximate to said seal wall at a downstream air side of said seal wall.

* * * * *